United States Patent
Zhang et al.

(10) Patent No.: US 10,862,527 B2
(45) Date of Patent: Dec. 8, 2020

(54) RADIO-FREQUENCY SWITCH AND CONTROL METHOD THEREFOR

(71) Applicant: SMARTER MICROELECTRONICS (SHANGHAI) CO., LTD., Shanghai (CN)

(72) Inventors: Silong Zhang, Shanghai (CN); Qiang Su, Shanghai (CN); Jun Ma, Shanghai (CN); Yang Li, Shanghai (CN)

(73) Assignee: SMARTER MICROELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/683,921

(22) Filed: Nov. 14, 2019

(65) Prior Publication Data

US 2020/0083923 A1    Mar. 12, 2020

Related U.S. Application Data

(63) Continuation of application No. PCT/CN2017/113384, filed on Nov. 28, 2017.

(30) Foreign Application Priority Data

May 15, 2017  (CN) ........................ 2017 1 0338926

(51) Int. Cl.
*H04B 1/44*   (2006.01)
*H04B 1/00*   (2006.01)
*H04B 7/06*   (2006.01)
*H04B 7/08*   (2006.01)

(52) U.S. Cl.
CPC ............. *H04B 1/44* (2013.01); *H04B 1/0067* (2013.01); *H04B 7/0602* (2013.01); *H04B 7/0817* (2013.01)

(58) Field of Classification Search
CPC ......................................................... H04B 1/44
See application file for complete search history.

(56) References Cited

U.S. PATENT DOCUMENTS

| | | | |
|---|---|---|---|
| 2002/0106988 A1* | 8/2002 | Davie | G01D 9/005 455/39 |
| 2002/0183032 A1* | 12/2002 | Fang | G06F 1/1616 455/280 |
| 2004/0192222 A1* | 9/2004 | Vaisanen | H04B 1/3805 455/78 |

(Continued)

*Primary Examiner* — Hsinchun Liao
(74) *Attorney, Agent, or Firm* — Syncoda LLC; Feng Ma

(57) ABSTRACT

A radio-frequency switch includes: at least two signal transmission modules, each signal transmission module includes a common port, a first series branch module, a second series branch module and a branch port; a parallel branch module; and a ground port. The parallel branch module is disposed between the ground port and a first terminal, and the first terminal is disposed between the first series branch module and the second series branch module. The common port is further connected with common ports of the other signal transmission modules in the radio-frequency switch, and the branch port is further connected with branch ports of the other signal transmission modules in the radio-frequency switch. State switching of the radio-frequency switch is realized by changing states of the first series branch module, the second series branch module and the parallel branch module.

15 Claims, 4 Drawing Sheets

(56) References Cited

U.S. PATENT DOCUMENTS

| | | | |
|---|---|---|---|
| 2005/0085201 A1* | 4/2005 | Martin | H04B 1/406 455/168.1 |
| 2007/0129104 A1* | 6/2007 | Sano | H04W 52/42 455/553.1 |
| 2014/0016489 A1* | 1/2014 | Chen | H04B 1/1027 370/252 |
| 2017/0237451 A1* | 8/2017 | Khlat | H04B 1/0057 375/219 |
| 2017/0331447 A1* | 11/2017 | Lee | H04B 1/0458 |

* cited by examiner

RADIO-FREQUENCY SWITCH AND CONTROL METHOD THEREFOR

CROSS-REFERENCE TO RELATED APPLICATIONS

This application is a continuation of PCT/CN2017/113384 filed on Nov. 28, 2017, which claims priority to China Patent Application No. 201710338926.5 filed on May 15, 2017. The disclosures of these applications are hereby incorporated by reference in their entirety.

BACKGROUND

A radio frequency front-end module (FEM) is typically a chip composed of a power amplifier and a multi-way switch. If a received multi-frequency mobile signal is a radio frequency signal which is to be filtered, a power amplifier and a filter in a frequency band corresponding to the filtering are connected with a transmitting/receiving switch of the FEM.

SUMMARY

The present disclosure relates generally to wireless communication technologies, and more specifically to a radio frequency switch and a method for controlling the radio frequency switch.

A radio frequency switch and a method for controlling the radio frequency switch are provided according to the embodiments of the disclosure, which can solve problems such as that isolation of a radio frequency switch is reduced due to a coupling effect.

A radio frequency switch is provided according to some embodiments of the disclosure, which includes:

at least two signal transmission modules, each of which signal transmission module including:

a common port, a first series branch module, a second series branch module and a branch port which are connected in sequence; and a parallel branch module and a ground port, wherein the parallel branch module is disposed between the ground port and a first end, and the first end is disposed between the first series branch module and the second series branch module.

The common port of one of the at least two signal transmission modules can be further connected to a common port of other signal transmission module in the radio frequency switch, and the branch port of one of the at least two signal transmission modules can be further connected to a branch port of other signal transmission module in the radio frequency switch.

The first series branch module can be configured to be in a conductive state together with the second series branch module in response to a conduction control signal in a case that the signal transmission module is to be in an operating state.

The parallel branch module can be configured to be in a nonconductive state in response to a non-conduction control signal in a case that the signal transmission module is to be in an operating state.

The first series branch module can be further configured to be in a nonconductive state together with the second series branch module in response to a non-conduction control signal in a case that the signal transmission module is to be in a non-operating state.

The parallel branch module can be further configured to be in a conductive state in response to the conduction control signal in a case that the signal transmission module is to be in a non-operating state.

In the above embodiments, the radio frequency switch can further include:

a logic control module, which is connected to the first series branch module, the second series branch module and the parallel branch module, and configured to, in response to a received operating state control signal, send the conduction control signal to the first series branch module and the second series branch module, and send the non-conduction control signal to the parallel branch module.

The logic control module can be further configured to, in response to a received non-operating state control signal, send the non-conduction control signal to the first series branch module and the second series branch module, and send the conduction control signal to the parallel branch module.

In the above embodiments, the logic control module can include:

a first logic control module, which is connected to the first series branch module and the second series branch module, and configured to, in response to the received operating state control signal, send the conduction control signal to the first series branch module and the second series branch module, and in response to the received non-operating state control signal, send the non-conduction control signal to the first series branch module and the second series branch module; and a second logic control module, which is connected to the parallel branch module, and configured to, in response to the received operating state control signal, send the non-conduction control signal to the parallel branch module, and in response to the received non-operating state control signal, send the conduction control signal to the parallel branch module.

In the above embodiments, the first logic control module can include:

a first logic sub-module, which is connected to the first series branch module, and configured to, in response to the received operating state control signal, send the conduction control signal to the first series branch module, and in response to the received non-operating state control signal, send the non-conduction control signal to the first series branch module; and a second logic sub-module, which is connected to the second series branch module, and configured to, in response to the received operating state control signal, send the conduction control signal to the second series branch module, and in response to the received non-operating state control signal, send the non-conduction control signal to the second series branch module.

In the above embodiments, the radio frequency switch can further include:

a signal source module, which is connected to the logic control module, and configured to send the operating state control signal to the logic control module, to enable the signal transmission module to be in an operating state, where the first series branch module and the second series branch module are in a conductive state, and the parallel branch module is in a nonconductive state.

The signal source module can be further configured to send the non-operating state control signal to the logic control module, to enable the signal transmission module to be in a non-operating state, where the first series branch module and the second series branch module are nonconductive, and the parallel branch module is controlled to be in a conductive state.

In the above embodiments, the radio frequency switch can further include: a first signal source module, which is connected to the first logic control module, and configured to send the operating state control signal to the first logic control module, where the first logic control module controls the first series branch module and the second series branch module to be in a conductive state, and send the non-operating state control signal to the first logic control module, where the first logic control module controls the first series branch module and the second series branch module to be in a nonconductive state; and a second signal source module, which is connected to the second logic control module, and configured to send the operating state control signal to the second logic control module, where the second logic control module controls the parallel branch module to be in a nonconductive state, and send the non-operating state control signal to the second logic control module, where the second logic control module controls the parallel branch module to be in a conductive state.

In the above embodiments, the first signal source module can include:

a first sub-module, which is connected to the first logic sub-module, and configured to send a first change of the operating state control signal to the first logic sub-module in a case that the signal transmission module is to be in an operating state, and send a first change of the non-operating state control signal to the first logic sub-module in a case that the signal transmission module is to be in a non-operating state; and a second sub-module, which is connected to the second logic sub-module, and configured to send a first change of the operating state control signal to the second logic sub-module in a case that the signal transmission module is to be in an operating state, and send a first change of the non-operating state control signal to the second logic sub-module in a case that the signal transmission module is to be in a non-operating state.

In the above embodiments, the signal transmission module can further include:

three chip pads, which are correspondingly disposed in the first series branch module, the second series branch module and the parallel branch module, and configured to solder switch sub-modules in the first series branch module, the second series branch module and the parallel branch module respectively.

In the above embodiments, the radio frequency switch can further include:

N+1 pins, where N is equal to the number of the at least two signal transmission modules.

Each of the at least two signal transmission module can further include: a first bonding wire, a second bonding wire and a third bonding wire. First ends of the first bonding wire, the second bonding wire and the third bonding wire are connected to the chip pads in one-to-one correspondence manner, and a second end of the first bonding wire is connected to an n-th pin of the radio frequency switch.

The n-th pin can be connected to the second end of the first bonding wire in the n-th signal transmission module, where n ranges from 1 to N.

The N-th pin can be connected to a second end of the second bonding wire in each of the at least two signal transmission modules.

The (N+1)-th pin can be connected to a second end of the third bonding wire in each of the at least two signal transmission modules.

The radio frequency switch can further include:

a carrier, configured to package the at least two signal transmission modules.

Second ends of the N+1 pins can be all exposed outside the carrier.

A method for controlling a radio frequency switch is provided according to some embodiments of the disclosure. The radio frequency switch can include:

at least two signal transmission modules, where each of the signal transmission module includes:

a common port, a first series branch module, a second series branch module and a branch port which are connected in sequence; and a parallel branch module and a ground port, where the parallel branch module is disposed between the ground port and a first end, and the first end is disposed between the first series branch module and the second series branch module.

The common port of one of the at least two signal transmission modules is further connected to a common port of other signal transmission module in the radio frequency switch, and the branch port of one of the at least two signal transmission modules is further connected to a branch port of other signal transmission module in the radio frequency switch.

The Method can Include:

enabling both the first series branch module and the second series branch module to be in a conductive state in response to a conduction control signal, and enabling the parallel branch module to be in a nonconductive state in response to a non-conduction control signal, in a case that the signal transmission module is to be in an operating state; and enabling both the first series branch module and the second series branch module to be in a nonconductive state in response to the non-conduction control signal, and enabling the parallel branch module to be in a conductive state in response to the conduction control signal, in a case that the signal transmission module is to be in a non-operating state.

In the above embodiments, the radio frequency switch can further include: a logic control module, which is connected to the first series branch module, the second series branch module and the parallel branch module.

The method further includes: performing, by the logic control module, one of operations as follows in response to a received control signal:

controlling, in response to a received operating state control signal, the first series branch module and the second series branch module to be in a conductive state;

controlling, in response to a received operating state control signal, the parallel branch module to be in a nonconductive state;

controlling, in response to a received non-operating state control signal, the first series branch module and the second series branch module to be in a nonconductive state; and controlling, in response to a received non-operating state control signal, the parallel branch module to be in a conductive state.

In the above embodiments, the radio frequency switch can further include a signal source module, which is connected to the logic control module.

The method further includes:

sending, by the signal source module, the operating state control signal to the logic control module, to enable the first series branch module and the second series branch module to be in a conductive state, and enable the parallel branch module to be in a nonconductive state; or, sending, by the signal source module, the non-operating state control signal to the logic control module, to enable the first series branch module and the second series branch module to be nonconductive, and enable the parallel branch module to be in a conductive state.

In the embodiments of the disclosure, the first series branch module, the second series branch module and the parallel branch module can be conductive or nonconductive, to switch between an operating state and a non-operating state, and different isolations of the radio frequency switch are implemented in the conductive and nonconductive states of the parallel branch module.

In the embodiments of the disclosure, the parallel branch module and the series branch module of the signal transmission module in the radio frequency switch are controlled independently, thereby flexibly regulating the isolation of the switch. Moreover, in a case that the signal transmission module of the radio frequency switch is in a non-operating state, even if a signal leaks in the first series branch module, the parallel branch module in an operating state is a low resistance path relative to the second series branch module that is not connected to a branch port, since the parallel branch module is connected to a ground port. Therefore, a leaked signal is sent to the parallel branch module in the operating state. In the embodiments of the disclosure, an application environment is not defined, and it is simple and convenient to implement, and an application range is wide.

DETAILED DESCRIPTION

Figure 1:
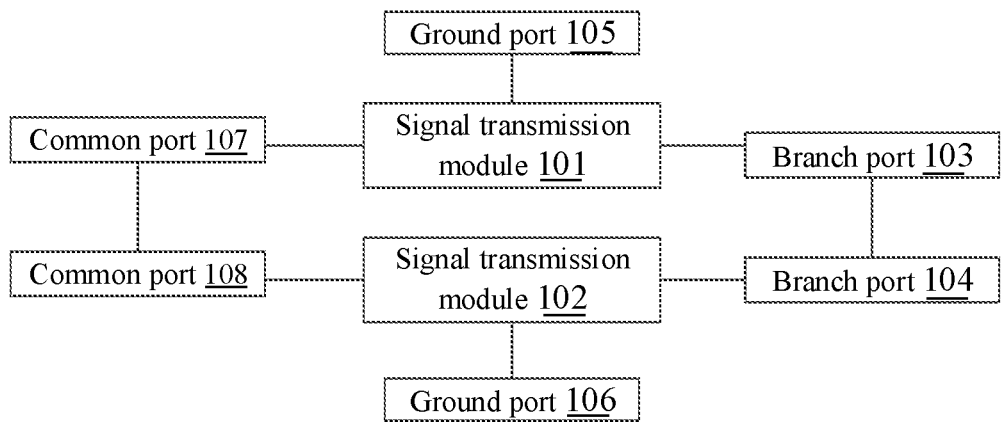
FIG. 1 is a schematic diagram showing a connection between two signal transmission modules in a radio frequency switch according to some embodiments of the disclosure.

In order to make the features and technical contents of the embodiments of the disclosure be interpreted in detail, the implementation of the embodiment of the disclosure is described in detail below in conjunction with the accompanying drawings, and the accompanying drawings are merely used for illustrative purposes and are not intended to limit the disclosure.

In the description of the embodiment of the disclosure, it should be noted that, unless otherwise stated and limited, the term "connection" should be interpreted broadly. For example, the connection may be an electrical connection or internal communication between two components, and may be a direct connection or an indirect connection through an intermediate medium. The meaning of the above terms can be understood by those skilled in the art according to the specific situation.

It should be noted that the terms "first/second/third" involved in the embodiment of the disclosure is merely used for distinguishing similar objects, and does not represent an order of the objects. It should be appreciated that objects distinguished by "first/second/third" may be swapped in an order or sequence, where permitted. It should be appreciated that the objects distinguished by "first\second\third" may be interchanged under appropriate conditions, so that the embodiment of the disclosure described here can be implemented in a sequence other than a sequence graphically shown or described here.

The typical FEM can have an increase in the area and volume resulting from its of amplifiers, switches, and connections, and an increase in the number of chips, and high cost. Various embodiments of the present disclosure can address some of the problems.

Before detailed description of the disclosure, the nouns and terms involved in the embodiment of the disclosure are illustrated, and the nouns and terms involved in the embodiment of the disclosure are interpreted as follows.

Isolation is a ratio of power of a local signal or a radio frequency signal which leaks to other port to input power in a signal transmission module of a radio frequency switch. The signal transmission modules in the radio frequency switch should meet different requirements for the isolation.

A parallel branch is provided in each of multiple signal transmission modules in the radio frequency switch, and is configured to connect a branch port and a ground port of the signal transmission module.

A first series branch is provided in each of the multiple signal transmission modules in the radio frequency switch, and is configured to connect a second series branch and a common port of the signal transmission module.

A second series branch is provided in each of the multiple signal transmission modules in the radio frequency switch, and is configured to connect a first series branch and a branch port of the signal transmission module.

The Radio frequency switch is packaged in an integrated circuit chip, and each includes multiple signal transmission modules. Each of the signal transmission modules includes a first series branch, a second series branch and a parallel branch. A bonding wire is led out from each of the first series branch, the second series branch and the parallel branch, to be connected to a pin of the chip.

An operating state is a state in which the signal transmission module performs signal transmission.

A non-operating state is a state in which the signal transmission module stops performing signal transmission.

FIG. 1 is a schematic diagram showing a connection between two signal transmission modules in a radio frequency switch according to some embodiments of the disclosure. The radio frequency switch includes two signal transmission modules. A signal transmission module 101 and a signal transmission module 102 shown in FIG. 1 are taken as an example. A branch port 103 of the signal transmission module 101 is connected with a branch port 104 of the signal transmission module 102. A common port 107 of the signal transmission module 101 is connected with a common port 108 of the signal transmission module 102.

The signal transmission module further includes a ground port 105. The signal transmission module 102 further includes a ground port 106.

Figure 2:
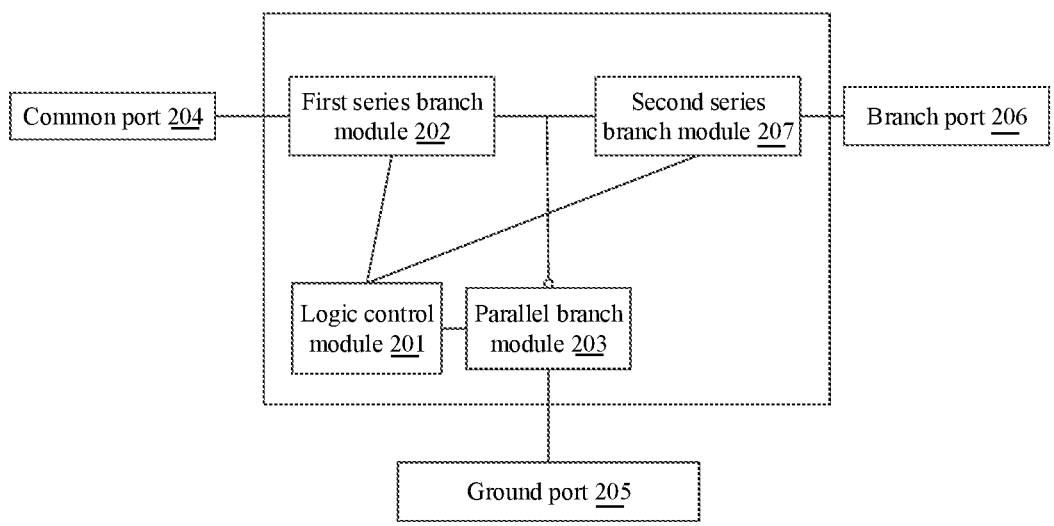
FIG. 2 is a schematic diagram showing an optional composition structure of the signal transmission module in the radio frequency switch in FIG. 1 according to some embodiments of the disclosure.

FIG. 2 is a schematic diagram showing an optional composition structure of the signal transmission module in the radio frequency switch according to some embodiments of the disclosure. As shown in FIG. 2, the optional composition structure of the signal transmission module in the radio frequency switch according to the embodiment of the disclosure includes: a logic control module 201, a first series branch module 202, a second series branch module 207, a parallel branch module 203, a common port 204, a ground port 205 and a branch port 206.

In some embodiments, the first series branch module 202 is disposed between the common port 204 and the second series branch module 207. The second series branch module 207 is disposed between the branch port 206 and the first series branch module 202.

The parallel branch module 203 is disposed between the ground port 205 and a first end, and the first end is disposed between the first series branch module 202 and the second series branch module 207. Optionally, the first end is disposed at an intermediate point between the first series branch module 202 and the second series branch module 207.

The common port 204 of each of the signal transmission modules is connected to a common port of the radio frequency switch. The branch ports 206 of the signal transmission modules are connected with each other.

The logic control module 201 is connected with the first series branch module 202, the second series branch module 207 and the parallel branch module 203, and configured to control the first series branch module 202 to be conductive in response to a received operating state control signal, control the second series branch module 207 to be conductive in response to the received operating state control signal, and control the parallel branch module 203 to be nonconductive in response to the received operating state control signal, to trigger the signal transmission module to be in an operating state. In this case, the operating state control signal can be a high-level signal, which can be represented by numbers 10 and 100.

The logic control module 201 is further configured to control the first series branch module 202 to be nonconductive in response to a received non-operating state control signal, control the second series branch module 207 to be nonconductive in response to the received non-operating state control signal, and control the parallel branch module 203 to be conductive in response to the received non-operating state control signal, so as to enable the signal transmission module to be in a non-operating state. In this case, the non-operating state control signal can be a low-level signal, which can be represented by numbers 01 and 010.

In some embodiments, the operating state corresponds to the operating state of the signal transmission module. In the operating state, the first series branch module 202 and the second series branch module 207 in the signal transmission module are in a connected state, and the parallel branch module 203 is in a disconnected state.

The non-operating state corresponds to the non-operating state of the signal transmission module. In the non-operating state, the first series branch module 202 and the second series branch module 207 in the signal transmission module are in a disconnected state, and the parallel branch module 203 is in a connected state.

In practical applications, the logic control module 201 can include a first logic control module and a second logic control module. The first logic control module is connected to the first series branch module and the second series branch module, and configured to control the first series branch module and the second series branch module to be in a conductive state in response to the received operating state control signal, and control the first series branch module and the second series branch module to be in a nonconductive state in response to the received non-operating state control signal.

The second logic control module is connected to the parallel branch module, and configured to control the parallel branch module to be in a nonconductive state in response to the received operating state control signal, and control the parallel branch module to be in a conductive state in response to the received non-operating state control signal.

In a case that the signal transmission module of the radio frequency switch is in a non-operating state, even if a signal leaks in the first series branch module, the parallel branch module in an operating state is a low resistance path relative to the second series branch module that is not connected to the branch port, since the parallel branch module is connected to the ground port. Therefore, a leaked signal is sent to the parallel branch module in the operating state, thereby having no influence on isolation of the radio frequency switch due to transmission of a coupling signal.

Figure 3:
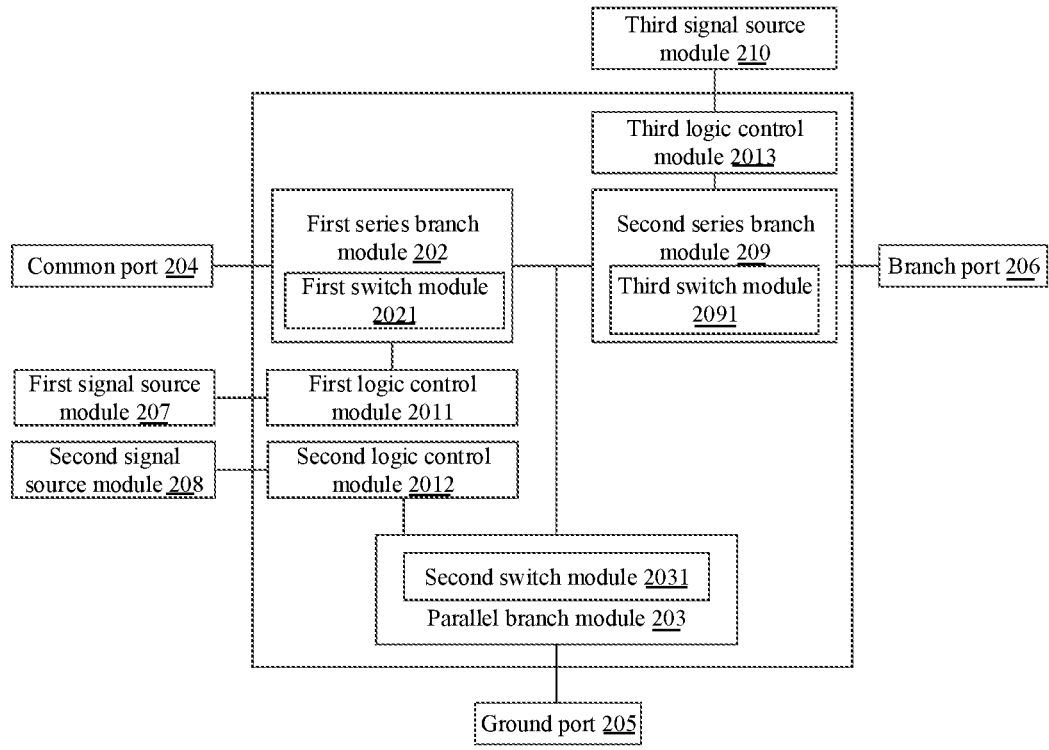
FIG. 3 is a schematic diagram showing another optional composition structure of a signal transmission module in the radio frequency switch in FIG. 1 according to some embodiments of the disclosure.

FIG. 3 is a schematic diagram showing another optional composition structure of the signal transmission module in FIG. 1 according to the embodiment of the disclosure. As shown in FIG. 3, the optional composition structure of the signal transmission module according to the embodiment of the disclosure includes:

a first logic control module 2011, a second logic control module 2012, a third logic control module 2013, a first series branch module 202, a first switch module 2021, a second series branch module 209, a third switch module 2091, a parallel branch module 203, a second switch module 2031, a common port 204, a ground port 205, a branch port 206, a first signal source module 207, a second signal source module 208 and a third signal source module 210.

In some embodiments, the first series branch module 202 is disposed between the common port 204 and the second series branch module 209.

The second series branch module 209 is disposed between the branch port 206 and the first series branch module 202.

The parallel branch module 203 is disposed between the ground port 205 and a connection midpoint between the first series branch module 202 and the second series branch module 209.

The common port 204 of each of the signal transmission modules is connected to a common port of the radio frequency switch. The branch ports 206 of the signal transmission modules are connected with each other.

A first end of the first logic control module 2011 is connected to the first series branch module 202.

The first logic control module 2011 is configured to perform one of the following operations:

sending a conduction control signal to the first series branch module 202 in response to a received operating state control signal to control the first series branch module 202 to be conductive; or sending a non-conduction control signal to the first series branch module 202 in response to a received non-operating state control signal to control the first series branch module 202 to be nonconductive.

A first end of the second logic control module 2012 is connected to the parallel branch module 203.

The second logic control module 2012 is configured to perform one of the following operations:

sending a non-conduction control signal to the parallel branch module 203 in response to a received operating state control signal to control the parallel branch module 203 to be nonconductive; or, sending a conduction control signal to the parallel branch module 203 in response to the received non-operating state control signal to control the parallel branch module 203 to be conductive.

A first end of the third logic control module 2013 is connected to the second series branch module 209.

The third logic control module 2013 is configured to perform one of the following operations:

sending a conduction control signal to the second series branch module 209 in response to the received operating state control signal to control the second series branch module 209 to be conductive; or sending a non-conduction control signal to the second series branch module 209 in response to the received non-operating state control signal to control the second series branch module 209 to be nonconductive.

The radio frequency switch further includes a first switch module 2021 disposed in the first series branch module 202.

The first switch module is configured to perform one of the following operations:

in a case that the first switch module is in a closed state under the control of the first logic control module 2011, enabling the first series branch module 202 to be conductive, to connect the common port 204 and the second series branch module 209; or in a case that the first switch module is in an open state under the control of the first logic control module 2011, enabling the common port 204 and the second series branch module 209 to be disconnected, to disconnect the first series branch module 202.

The radio frequency switch further includes a second switch module 2031 disposed in the parallel branch module 203.

The second switch module is configured to perform one of the following operations:

in a case that the second switch module is in a closed state under the control of the second logic control module 2012, enabling the parallel branch module 203 to be conductive, to connect the ground port 205 and a connection midpoint between the first series branch module 202 and the second series branch module 209; or in a case that the second switch module is in an open state under the control of the second logic control module 2012, disconnecting the ground port 205 from the connection midpoint between the first series branch module 202 and the second series branch module 209, to make the parallel branch module 203 be nonconductive.

The radio frequency switch further includes a third switch module 2091 disposed in the second series branch module 209.

The third switch module is configured to perform one of the following operations:

in a case that the third switch module is in a closed state under the control of the third logic control module 2013, enabling the second series branch module 209 to be conductive, to connect the branch port 206 and the first series branch module 202; or in a case that the third switch module is in an open state under the control of the third logic control module 2013, disconnecting the branch port 206 from the first series branch module 202, to make the second series branch module 209 to be nonconductive.

The radio frequency switch further includes: a first signal source module 207 connected to a second end of the first logic control module 2011, a second signal source 208, and a third signal source 210.

The first signal source module is configured to perform one of the following operations:

sending an operating state control signal to the first logic control module 2011, such that the first logic control module controls the first series branch module 202 to be conductive; or, sending a non-operating state control signal to the first logic control module 2011, such that the first logic control module controls the first series branch module 202 to be nonconductive.

The second signal source module 208 is connected to a second end of the second logic control module 2012.

The second signal source module is configured to perform one of the following operations:

sending the operating state control signal to the second logic control module 2012, such that the second logic control module controls the parallel branch module 203 to be nonconductive; or, sending the non-operating state control signal to the second logic control module 2012, such that the second logic control module controls the parallel branch module 203 to be conductive.

The third signal source module 210 is connected to a second end of the third logic control module 2013.

The third signal source module is configured to perform one of the following operations:

sending the operating state control signal to the third logic control module 2013, such that the third logic control module controls the second series branch module 209 to be conductive; or, sending the non-operating state control signal to the third logic control module 2013, such that the third logic control module controls the second series branch module 209 to be nonconductive.

Since the first series branch module 202 and the second series branch module 209 are conductive or nonconductive simultaneously, the first signal source module 207 and the third signal source module 210 can be integrated into one signal source module, and the first logic control module 2011 and the third logic control module can be integrated into one logic control module in practical applications.

In a case that the signal transmission module of the radio frequency switch is in a non-operating state, even if a signal leaks in the first series branch module, the parallel branch module in an operating state is a low resistance path relative to the second series branch module that is not connected to the branch port, since the parallel branch module is connected to the ground port. Therefore, a leaked signal is sent to the parallel branch module in the operating state, thereby having no influence on isolation of the radio frequency switch due to transmission of a coupling signal.

Figure 4:
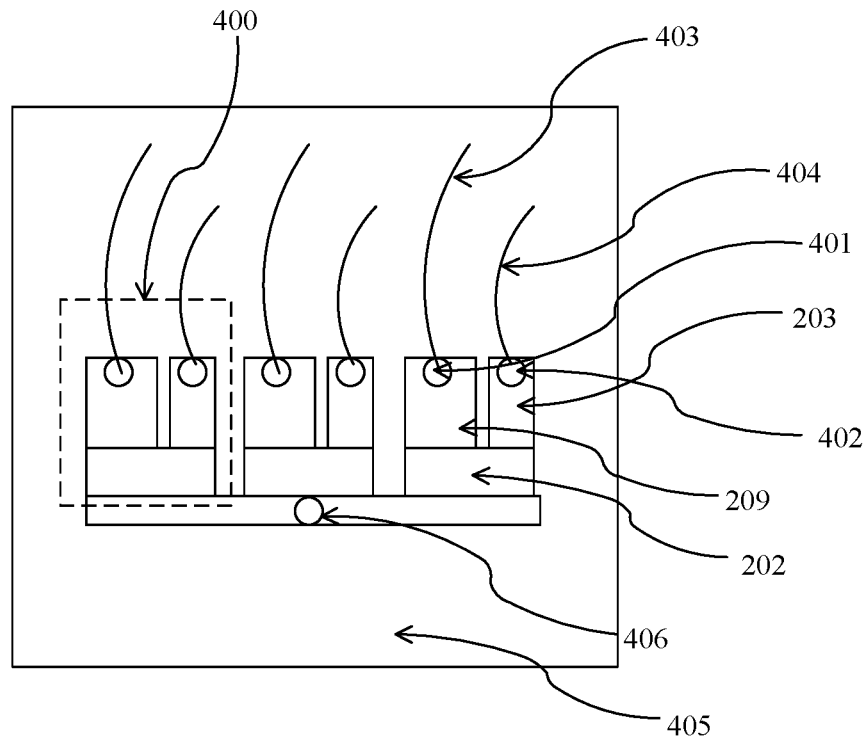
FIG. 4 is a schematic diagram showing a package of a radio frequency switch including the signal transmission module shown in FIG. 2 according to some embodiments of the disclosure.

FIG. 4 is a schematic diagram showing a package of a radio frequency switch including the signal transmission module shown in FIG. 2 according to some embodiments of the disclosure. As shown in FIG. 4, in addition to the signal transmission module 400, the radio frequency switch further includes: a first chip pad 401, a second chip pad 402, a first bonding wire 403, a second bonding wire 404, a carrier 405 and a common port 406.

The first chip pad 401 is disposed in the second series branch module 209, and configured to solder the first series branch module 202 and the second series branch module 209 in the carrier 405. The second chip pad 402 is disposed in the parallel branch module 203, and configured to solder the parallel branch module 203 in the carrier 405.

A first end of the first bonding wire 403 is connected to the first chip pad 401, and a first end of the second bonding wire 404 is connected to the second chip pad 402.

When the radio frequency switch is packaged, the at least two signal transmission modules are packaged in the carrier in an arrangement manner. The arrangement manner includes but is not limited to symmetric arrangement or linear arrangement.

The radio frequency switch further includes:

N+1 pins, N is equal to the number of the signal transmission modules.

An n-th pin is connected to the second end of the first bonding wire in the n-th signal transmission module, n ranging from 1 to N.

The (N+1)-th pin is connected to a second end of the second bonding wire in each of the signal transmission modules.

The radio frequency switch further includes a carrier 405.

The carrier 405 is configured to package the at least two signal transmission modules.

In actual usage, the carrier 405 includes but is not limited to a substrate and a Printed Circuit Board (PCB).

Each of second ends of the N+1 pins is exposed outside the carrier 405.

In practical applications, the radio frequency switch can be packaged by the first carrier and the second carrier sequentially. After the radio frequency switch is packaged by the first carrier, the common port, the branch port and the ground port of the signal transmission module and the second ends of the pins are all exposed outside the first carrier. Then, after the radio frequency is package by the second slide, only the second ends of the pins are exposed outside the second carrier for protecting the common port, the branch port and the ground port of the signal transmission module.

Figure 5:
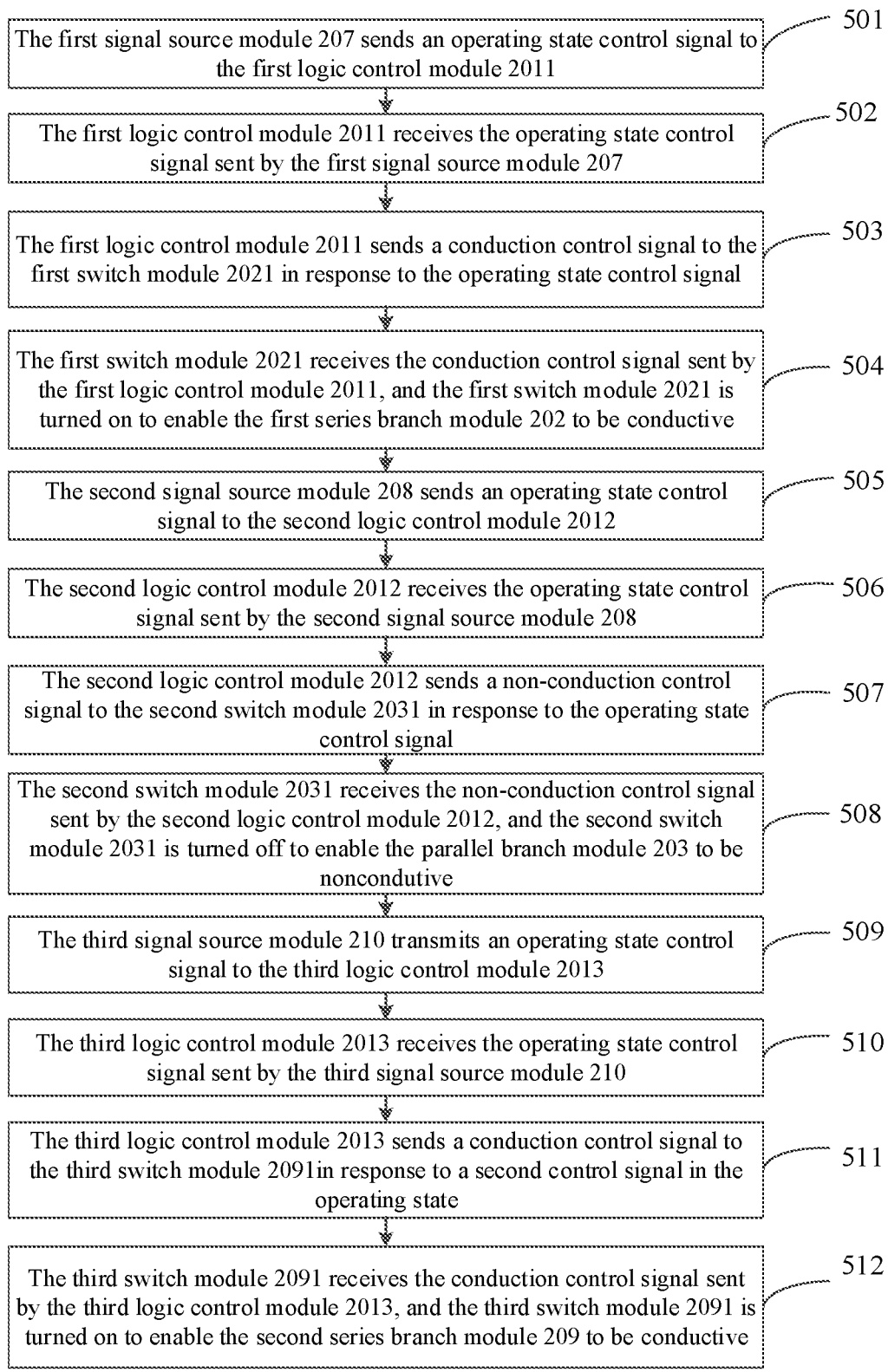
FIG. 5 is a schematic diagram showing an implementation flow of a method for controlling a radio frequency switch according to some embodiments of the disclosure.

FIG. 5 is a schematic diagram showing an implementation flow of a method for controlling a radio frequency switch according to some embodiments of the disclosure. The composition of a signal transmission module of the radio frequency switch according to the embodiment is as shown in FIG. 3, which includes:

a first logic control module 2011, a second logic control module 2012, a third logic control module 2013, a first series branch module 202, a first switch module 2021, a second series branch module 209, a third switch module 2091, a parallel branch module 203, a second switch module 2031, a common port 204, a ground port 205, a branch port 206, a first signal source module 207, a second signal source module 208 and a third signal source module 210.

The first series branch module 202 is disposed between the common port 204 and the second series branch module 209.

The second series branch module 209 is disposed between the branch port 206 and the first series branch module 202.

The parallel branch module 203 is disposed between the ground port 205 and a connection midpoint between the first series branch module 202 and the second series branch module 209.

The common port 204 of each of the signal transmission modules is connected to a common port of the radio frequency switch. The branch ports 206 of the signal transmission modules are connected with each other.

A first end of the first logic control module 2011 is connected to the first series branch module 202. A first end of the second logic control module 2012 is connected to the parallel branch module 203. A first end of the third logic control module 2013 is connected to the second series branch module 209. The first switch module 2021 is disposed in the first series branch module 202. The second switch module 2031 is disposed in the parallel branch module 203. The third switch module 2091 is disposed in the second series branch module 209. The first signal source module 207 is connected to a second end of the first logic control module 2011. The second signal source module 208 is connected to a second end of the second logic control module 2012. The third signal source module 210 is connected to a second end of the third logic control module 2013.

As shown in FIG. 5, the implementation flow of the method for controlling a radio frequency switch according to some embodiments of the disclosure includes steps 501 to 512 as follows.

At step 501, the first signal source module 207 sends an operating state control signal to the first logic control module 2011.

At step 502, the first logic control module 2011 receives the operating state control signal sent by the first signal source module 207.

At step 503, the first logic control module 2011 sends a conduction control signal to the first switch module 2021 in response to the operating state control signal.

At step 504, the first switch module 2021 is turned on upon receiving the conduction control signal sent by the first logic control module 2011, to enable the first series branch module 202 to be conductive.

At step 505, the second signal source module 208 sends an operating state control signal to the second logic control module 2012.

At step 506, the second logic control module 2012 receives the operating state control signal sent by the second signal source module 208.

At step 507, the second logic control module 2012 sends a non-conduction control signal to the second switch module 2031 in response to the operating state control signal.

At step 508, the second switch module 2031 is turned off upon receiving the non-conduction control signal sent by the second logic control module 2012, to enable the parallel branch module 203 to be nonconductive.

At step 509, the third signal source module 210 sends an operating state control signal to the third logic control module 2013.

At step 510, the third logic control module 2013 receives the operating state control signal sent by the third signal source module 210.

At step 511, the third logic control module 2013 sends a conduction control signal to the third switch module 2091 in response to the operating state control signal.

At step 512, the third switch module 2091 is turned on upon receiving the conduction control signal sent by the third logic control module 2013, to make the second series branch module 209 to be conductive.

In this case, the first series branch module 202 is conductive, the second series branch module 209 is conductive, the parallel branch module 203 is nonconductive, and the signal transmission module is in an operating state, for implementing signal transmission.

Figure 6:
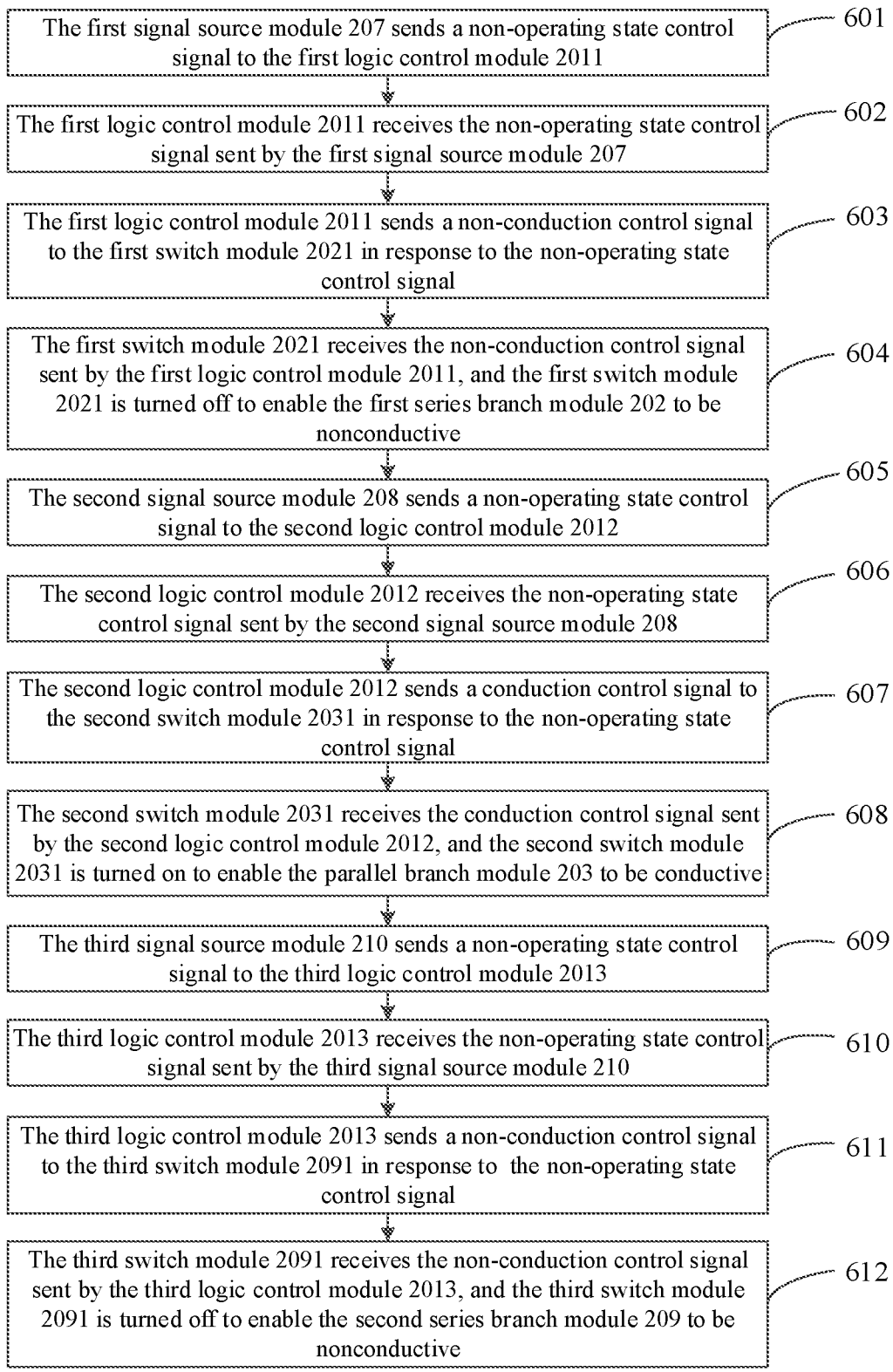
FIG. 6 is a schematic diagram showing an implementation flow of a method for controlling a radio frequency switch according to some embodiments of the disclosure.

FIG. 6 is a schematic diagram showing an implementation flow of a method for controlling a radio frequency switch according to some embodiments of the disclosure. The composition of a signal transmission module of the radio frequency switch used is as shown in FIG. 3, which includes:

a first logic control module 2011, a second logic control module 2012, a third logic control module 2013, a first series branch module 202, a first switch module 2021, a second series branch module 209, a third switch module 2091, a parallel branch module 203, a second switch module 2031, a common port 204, a ground port 205, a branch port 206, a first signal source module 207, a second signal source module 208, and a third signal source module 210.

The first series branch module 202 is disposed between the common port 204 and the second series branch module 209.

The second series branch module 209 is disposed between the branch port 206 and the first series branch module 202.

The parallel branch module 203 is disposed between the ground port 205 and a connection midpoint of the first series branch module 202 and the second series branch module 209.

The common port 204 of each of the signal transmission modules is connected to a common port of the radio frequency switch. The branch ports 206 of the signal transmission modules are connected with each other.

A first end of the first logic control module 2011 is connected to the first series branch module 202. A first end of the second logic control module 2012 is connected to the parallel branch module 203. A first end of the third logic control module 2013 is connected to the second series branch module 209. The first switch module 2021 is disposed in the first series branch module 202. The second switch module 2031 is disposed in the parallel branch module 203. The third switch module 2091 is disposed in the second series branch module 209. The first signal source module 207 is connected to a second end of the first logic control module 2011. The second signal source module 208 is connected to a second end of the second logic control module 2012. The third signal source module 210 is connected to a second end of the third logic control module 2013.

As shown in FIG. 6, the implementation flow of a method for controlling a radio frequency switch according to some embodiments of the disclosure can include steps 601 to 612 as follows.

At step 601, the first signal source module 207 sends a non-operating state control signal to the first logic control module 2011.

At step 602, the first logic control module 2011 receives the non-operating state control signal sent by the first signal source module 207.

At step 603, the first logic control module 2011 sends a non-conduction control signal to the first switch module 2021 in response to the non-operating state control signal.

At step 604, the first switch module 2021 is turned off upon receiving the non-conduction control signal sent by the first logic control module 2011, to enable the first series branch module 202 to be nonconductive.

At step 605, the second signal source module 208 sends a non-operating state control signal to the second logic control module 2012.

At step 606, the second logic control module 2012 receives the non-operating state control signal sent by the second signal source module 208.

At step 607, the second logic control module 2012 sends a conduction control signal to the second switch module 2031 in response to the non-operating state control signal.

At step 608, the second switch module 2031 is turned on upon receiving the conduction control signal sent by the second logic control module 2012, to enable the parallel branch module 203 to be conductive.

At step 609, the third signal source module 210 sends a non-operating state control signal to the third logic control module 2013.

At step 610, the third logic control module 2013 receives the non-operating state control signal sent by the third signal source module 210.

At step 611, the third logic control module 2013 sends a non-conduction control signal to the third switch module 2091 in response to the non-operating state control signal.

At step 612, the third switch module 2091 is turned off upon receiving the non-conduction control signal sent by the third logic control module 2013, to enable the second series branch module 209 to be nonconductive.

In this case, the first series branch module 202 is turned off, the second series branch module 209 is turned off, the parallel branch module 203 is turned on, and the signal transmission module is in a non-operating state to cut off signal transmission.

In a case that the signal transmission module is in a non-operating state, the first series branch module 202 is nonconductive, the second series branch module 209 is nonconductive, and the parallel branch module 203 is conductive. In this way, even if a signal leaks in the first series branch module 202, the parallel branch module 203 is a low resistance path relative to the second series branch module 209 that is not connected to the branch port, since the parallel branch module 203 is connected to the ground port. Therefore, a leaked signal is sent to the ground port through the parallel branch module 203, thereby avoiding coupling transmission of a signal in the bonding wire.

In the embodiments of the disclosure, the series branch module and the parallel branch module are controlled by two control signals respectively, to realize switching between an operating state and a non-operating state, and different isolations of the radio frequency switch are implemented in the conductive and nonconductive states of the parallel branch module.

The coupling transmission of the signal in the bonding wire is cut off in the embodiment of the disclosure, thereby overcoming the defect in the related art that the isolation of the signal transmission module is affected due to coupling transmission of the signal in the signal transmission module. Meanwhile, in the embodiments of the disclosure, an application environment is not defined, and it is simple and convenient to implement, and an application range is wide.

The foregoing is only the preferred embodiment of the disclosure and is not intended to limit the protection scope of disclosure. Any modifications, equivalent substitutions, improvements and the like made within the spirit and principle of the disclosure shall fall within the protection scope of the disclosure.

A radio frequency switch is provided in the present disclosure, which includes: at least two signal transmission modules. Each of the signal transmission modules includes: a common port, a first series branch module, a second series branch module and a branch port, which are connected in sequence; a parallel branch module; and a ground port. The parallel branch module is disposed between the ground port and a first end, and the first end is disposed between the first series branch module and the second series branch module. The common port of one of the signal transmission modules is further connected to a common port of other signal transmission module in the radio frequency switch. The branch port of one of the signal transmission modules is further connected to a branch port of other signal transmission module in the radio frequency switch. A state of the radio frequency switch can be switched by changing states of the first series branch module, the second series branch module and the parallel branch module. A method for controlling a radio frequency switch is further provided in the present disclosure.

The invention claimed is:

1. A radio frequency switch, comprising: at least two signal transmission modules, wherein each of the at least two signal transmission modules comprises:
a common port, a first series branch module, a second series branch module and a branch port, which are connected in sequence; and
a parallel branch module and a ground port, wherein the parallel branch module is disposed between the ground port and a first end, and the first end is disposed between the first series branch module and the second series branch module,
wherein the common port of one of the at least two signal transmission modules is further connected to the common port of other signal transmission modules in the radio frequency switch, and the branch port of one of the at least two signal transmission modules is further connected to the branch port of other signal transmission module in the radio frequency switch;
the first series branch module is configured to be in a first conductive state together with the second series branch module in response to a first conduction control signal, in a case that the signal transmission module is to be in a first operating state;
the parallel branch module is configured to be in a first nonconductive state in response to a first non-conduction control signal, in the first case that the signal transmission module is to be in the first operating state;
the first series branch module is further configured to be in a second nonconductive state together with the second series branch module in response to a second non-conduction control signal in a case that the signal transmission module is to be in a first non-operating state; and
the parallel branch module is further configured to be in a second conductive state in response to a second conduction control signal in the case that the signal transmission module is to be in the first non-operating state.

2. The radio frequency switch according to claim 1, further comprising:
a logic control module, which is connected to the first series branch module, the second series branch module and the parallel branch module, and configured to, in response to a received first operating state control signal, send the first conduction control signal to the first series branch module and the second series branch module, and send the first non-conduction control signal to the parallel branch module, and further configured to, in response to a received first non-operating state control signal, send the second non-conduction control signal to the first series branch module and the second series branch module, and send the second conduction control signal to the parallel branch module.

3. The radio frequency switch according to claim 2, wherein the logic control module comprises:
a first logic control module, which is connected to the first series branch module and the second series branch module, and configured to send the first conduction control signal to the first series branch module and the second series branch module in response to the received first operating state control signal, and send the first non-conduction control signal to the first series branch module and the second series branch module in response to the received first non-operating state control signal; and
a second logic control module, which is connected to the parallel branch module, and configured to send the second non-conduction control signal to the parallel branch module in response to the received first operating state control signal, and send the second conduction control signal to the parallel branch module in response the received first non-operating state control signal.

4. The radio frequency switch according to claim 3, wherein the first logic control module comprises:
a first logic sub-module, which is connected to the first series branch module, and configured to send the first conduction control signal to the first series branch module in response to the received first operating state control signal, and send the first non-conduction control signal to the first series branch module in response to the received first non-operating state control signal; and
a second logic sub-module, which is connected to the second series branch module, and configured to send the second conduction control signal to the second series branch module in response to the received first operating state control signal, and send the second non-conduction control signal to the second series branch module in response to the received first non-operating state control signal.

5. The radio frequency switch according to claim 4, wherein the radio frequency switch further comprises:
a signal source module, which is connected to the logic control module, and configured to send the first operating state control signal to the logic control module, to enable the signal transmission module to be in the first operating state, wherein the first series branch module and the second series branch module are in the first conductive state, and the parallel branch module is in the first nonconductive state; and
wherein the signal source module is further configured to send the first non-operating state control signal to the logic control module, to enable the signal transmission module to be in the first non-operating state, wherein the first series branch module and the second series branch module are in the second nonconductive state, and the parallel branch module is controlled to be in the second conductive state.

6. The radio frequency switch according to claim 5, further comprising:
a first signal source module, which is connected to the first logic control module, and configured to send the first operating state control signal to the first logic control module, such that the first logic control module controls the first series branch module and the second series branch module to be in the first conductive state, and send the first non-operating state control signal to the first logic control module, such that the first logic control module controls the first series branch module and the second series branch module to be in the second nonconductive state; and
a second signal source module, which is connected to the second logic control module, and configured to send the first operating state control signal to the second logic control module, such that the second logic control module controls the parallel branch module to be in the first nonconductive state, and send the first non-operating state control signal to the second logic control module, such that the second logic control module controls the parallel branch module to be in the second conductive state.

7. The radio frequency switch according to claim 6, wherein the first signal source module comprises:
a first sub-module, which is connected to the first logic sub-module, and configured to send a first channel of the first operating state control signal to the first logic sub-module in the case that the signal transmission module is to be in the first operating state, and send a first channel of the first non-operating state control signal to the first logic sub-module in the case that the signal transmission module is to be in the first non-operating state; and
a second sub-module, which is connected to the second logic sub-module, and configured to send a first channel of the first operating state control signal to the second logic sub-module in a case that the signal transmission module is to be in the first operating state, and send a first channel of the first non-operating state control signal to the second logic sub-module in the case that the signal transmission module is to be in the first non-operating state.

8. The radio frequency switch according to claim 1, wherein the signal transmission module further comprises:
three chip pads respectively disposed in the first series branch module, the second series branch module and the parallel branch module, and configured to solder switch sub-modules in the first series branch module, the second series module and the parallel branch module corresponding to the three chip pads.

9. The radio frequency switch according to claim 8, further comprising:
N+1 pins, wherein N is equal to the number of the at least two signal transmission modules,
wherein:
each of the at least two signal transmission modules further comprises: a first bonding wire, a second bonding wire and a third bonding wire, wherein first ends of the first bonding wire, the second bonding wire and the third bonding wire are connected to the chip pads in a one-to-one correspondence manner, and a second end of the first bonding wire is connected to an n-th pin of the radio frequency switch;
the n-th pin is connected to the second end of the first bonding wire in the n-th signal transmission module, wherein n ranges from 1 to N;
the N-th pin is connected to a second end of the second bonding wire in each of the at least two signal transmission modules;
the (N+1)-th pin is connected to a second end of the third bonding wire in each of the at least two signal transmission modules;
the radio frequency switch further comprises: a carrier configured to package the at least two signal transmission modules; and
second ends of the N+1 pins are all exposed outside the carrier.

10. A method for controlling a radio frequency switch, applied to the radio frequency switch, and the radio frequency switch comprising:
at least two signal transmission modules, each of the at least two signal transmission modules comprising:
a common port, a first series branch module, a second series branch module and a branch port, which are connected in sequence;
a parallel branch module and a ground port, wherein the parallel branch module is disposed between the ground port and a first end, and the first end is disposed between the first series branch module and the second series branch module,
wherein the common port of one of the at least two signal transmission modules is further connected to the common port of other signal transmission module in the radio frequency switch, and the branch port of one of the at least two signal transmission modules is further connected to the branch port of other signal transmission module in the radio frequency switch,
and the method comprises:
enabling both the first series branch module and the second series branch module to be in a first conductive state in response to a first conduction control signal, and enabling the parallel branch module to be in a first nonconductive state in response to a first non-conduction control signal, in a case that the signal transmission module is to be in a first operating state; and
enabling both the first series branch module and the second series branch module to be in a second nonconductive state in response to the second non-conduction control signal, and enabling the parallel branch module to be in a second conductive state in response to the second conduction control signal, in a case that the signal transmission module is to be in a first non-operating state.

11. The method according to claim 10, wherein the radio frequency switch further comprises: a logic control module which is connected to the first series branch module, the second series branch module and the parallel branch module,
the method further comprises: performing, by the logic control module, one of operations as follows in response to a received control signal:
controlling, in response to a received first operating state control signal, the first series branch module and the second series branch module to be in the first conductive state;
controlling, in response to the received first operating state control signal, the parallel branch module to be in the first nonconductive state;
controlling, in response to a received first non-operating state control signal, the first series branch module and the second series branch module to be in the second nonconductive state; and
controlling, in response to the received first non-operating state control signal, the parallel branch module to be in the second conductive state.

12. The method according to claim 11, wherein the radio frequency switch further comprises a signal source module, which is connected to the logic control module,
the method further comprises:
sending, by the signal source module, the first operating state control signal to the logic control module, to enable the first series branch module and the second series branch module to be in the first conductive state, and enable the parallel branch module to be in the first nonconductive state; or,
sending, by the signal source module, the first non-operating state control signal to the logic control module, to enable the first series branch module and the second series branch module to be in the second nonconductive state, and enable the parallel branch module to be in the second conductive state.

13. An electronic apparatus comprising at least one radio frequency switch according to claim 1, wherein the series branch module and the parallel branch module are controlled by two control signals respectively, thereby realizing switching between the first operating state and the first non-operating state.

14. The electronic apparatus of claim 13, wherein different isolations of the radio frequency switch are implemented in the second conductive and first nonconductive states of the parallel branch module.

15. The electronic apparatus of claim 14, wherein coupling transmission of signals in bonding wires are cut off, thereby overcoming that an isolation of the signal transmission module is affected due to the coupling transmission of the signals in the signal transmission module.

* * * * *